United States Patent [19]

Utecht

[11] 4,145,019
[45] Mar. 20, 1979

[54] SUPPORT ELEMENT FOR INSTALLATION IN THE SUPPORT ASSEMBLY OF A VERTICAL ELECTRIC MACHINE

[75] Inventor: Manfred Utecht, Berlin, Fed. Rep. of Germany

[73] Assignee: Siemens Aktiengesellschaft, Munich, Fed. Rep. of Germany

[21] Appl. No.: 832,665

[22] Filed: Sep. 12, 1977

[30] Foreign Application Priority Data

Sep. 29, 1976 [DE] Fed. Rep. of Germany ....... 2644413

[51] Int. Cl.² .............................................. F16F 15/00
[52] U.S. Cl. ...................................... 267/121; 267/152
[58] Field of Search .............. 248/15, 20, 21, , 358 R, 248/9; 267/136, 137, 152, 30

[56] References Cited

U.S. PATENT DOCUMENTS

| | | | |
|---|---|---|---|
| 3,107,752 | 10/1963 | McClean | 248/358 R |
| 3,365,189 | 1/1968 | Carlson | 267/152 |
| 3,667,707 | 6/1972 | Mui | 248/358 R |
| 3,874,646 | 4/1975 | Vernier | 248/358 R |
| 3,888,449 | 6/1975 | Jablonski et al. | 248/358 R |
| 3,947,007 | 3/1976 | Pelat | 248/358 R |

*Primary Examiner*—Robert A. Hafer
*Attorney, Agent, or Firm*—Kenyon & Kenyon, Reilly, Carr & Chapin

[57] ABSTRACT

A support element comprising a first resilient housing means, a second rigid housing means and means including choke means for connecting the interiors of the first and second housing means. In accordance with the invention, the interior of the first housing means is completely filled with silicone rubber and the interior of the second housing means is filled partially with such rubber and partially with a compressible medium. In further accord with the invention, the first housing means exhibits elasticity in an action direction and otherwise volume stiffness with respect to increases in internal pressure, while the second housing means exhibits volume stiffness with respect to increases in internal pressure.

3 Claims, 2 Drawing Figures

SUPPORT ELEMENT FOR INSTALLATION IN THE SUPPORT ASSEMBLY OF A VERTICAL ELECTRIC MACHINE

BACKGROUND OF THE INVENTION

1. Field of the Invention

This invention relates to machine support elements and, in particular, to support elements for use in supporting electric machines such as, for example, hydraulic generators.

2. Description of the Prior Art

Support elements of the above-type must be made extremely stiff due to the vibrations which can occur during the operation of the machine they support. Since, however, parts of the machine can also become very warm during operation, very large thermal forces act on such support elements, thereby necessitating elaborate structures for the control thereof.

One known type of support element employs a spring element which is provided with liquid damping. Such a spring element is described in the German Auslegeschrift No. 1 035 413.1. It comprises, in substance, a rubber spring which forms a first housing which is resilient and whose interior is filled with a viscous medium such as, for example, a liquid. The aforesaid resilient first housing is connected via a connecting means including a choke means to a second housing which is only partially filled with the medium and which contains, in addition, a compressible medium. The throttled passage of liquid from one housing into the other then provides the desired damping.

In the aforesaid support element, the resilient first housing is formed of rubber and, hence, exhibits significant volume elasticity with respect to increased internal pressure. As a result, the throttled flow of the viscous medium exercises only an insignificant influence over the overall stiffness of the arrangement, which stiffness always remains relatively small.

It is an object of the present invention to provide a support element of the above-type which exhibits a relatively great degree of stiffness with respect to vibration and a relatively little degree of stiffness with respect to thermal expansion.

SUMMARY OF THE INVENTION

The above and other objectives are realized in accordance with the principles of the present invention in a support element of the above-type wherein the first housing of the element is formed from a housing means which exhibits elasticity in an action direction and otherwise volume stiffness with respect to an increase in internal pressure and wherein the second housing is formed from a housing means which exhibits volume stiffness with respect to an increase in internal pressure. In further accord with the invention the viscous medium used to completely fill and partially fill the respective interiors of the first and second housings comprises a silicone rubber.

With the support element of the invention so designed, the resilient first housing exhibits elastic or spring action only in the action direction and, thus, takes up slow volume changes which are caused by thermal expansion, without increased forces being brought about. Moreover, the silicone rubber in the interior of the first housing behaves for these low deformation rates like a highly viscous medium and passes, via the choke means, into the rigid second housing in accordance with a decrease of the volume of the interior of the first housing. The compressible medium located in the second housing is thereby compressed.

On the other hand, if vibrations, i.e., dynamic loads, act upon the support element, the stiffness of the resilient first housing is added to by an additional stiffness provided by the silicone rubber filling the housing. This additional stiffness is a function of the damping action of the choke means, the vibration frequency, the compressibility of the silicone rubber and the volume elasticity of the first housing with respect to internal pressure. In particular, this additional stiffness is found to increase considerably, the stiffness of the resilient housing and, hence, the support element. This is due, in part, to the fact that the viscosity of the silicone rubber increases suddenly with an increased rate of deformation, so that under such conditions the silicone rubber becomes rigid for all practical purposes and, hence, behaves substantially like a solid body.

The support element of the present invention thus exhibits a great degree of stiffness with respect to vibration loads and a small degree of stiffness with respect to thermal expansion.

BRIEF DESCRIPTION OF THE DRAWINGS

The above and other features and aspects of the present invention will become more apparent upon reading the following detailed description in conjunction with accompanying drawings, in which:

FIS. 1 and 2 illustrate first and second embodiments of a support element in accordance with the principles of the present invention.

DETAILED DESCRIPTION

Figure 1:
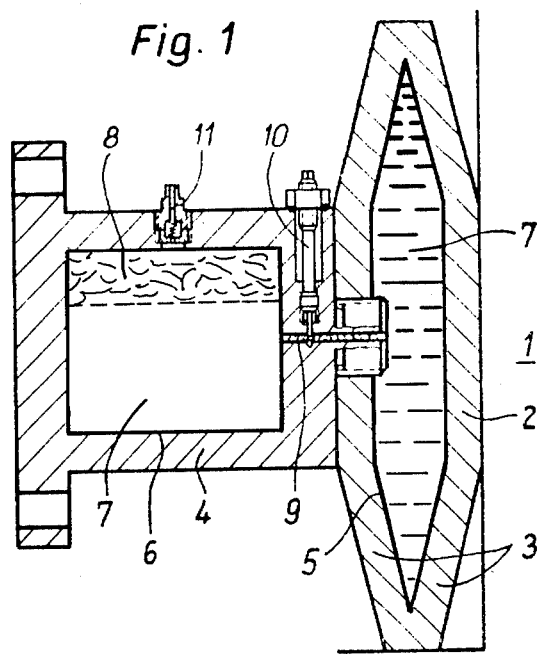

FIG. 1 shows a support element 1 in accordance with the invention. The element 1 comprises a resilient first metallic housing 2 formed by a pair of cup springs 3 and a stiff second metallic housing 4 which can be formed, for example, from steel or aluminum and which is solidly connected to the housing 2. The interior 5 of the housing 2 is completely filled and the interior 6 of the housing 4 is partially filled with a highly viscous silicone rubber 7. The space remaining in the interior of the second housing 4 is occupied by a compressible medium 8 which, for example, may be a gas, and which is under pressure. For pumping such compressible medium into the housing 4, a valve 11 is provided in the wall thereof.

The interior 5 of the housing 2 and the interior 6 of the housing 4 are connected to each other by a connecting means which includes a choke canal 9. A throttling pin 10 is further provided which projects into the canal 9 for adjusting the cross section thereof.

In use, the support element 1 is installed in a conventional manner in the support assembly of a vertical hydraulic generator as, for example, in the support of the upper spider at the foundation or the wall of the well. If thermal expansion of the parts being supported occurs due to operational temperature rises, then the cup springs 3 of the resilient housing 2 are deformed, in the course of which silicone rubber 7 passes from the interior 5 of the resilient housing 2 via the choke canal 9 into the interior 6 of the second housing 4, thereby further compressing the compressible medium 8. In this manner, the thermal expansion is taken up or absorbed by the cup springs 3 and no thermal forces appear at the well wall or the foundation. If the temperature then decreases to its original value, thereby relieving the cup springs 3, the silicone rubber 7 flows back in the same manner into the interior 5 of the resilient housing 2 and the compressible medium 8 is decompressed correspondingly.

If, on the other hand, vibrations of the parts being supported are coupled to the support element 1, the deformation rate of the silicone rubber 7 is increased. This, in turn, significantly increases the viscosity of the rubber causing the rubber to behave substantially like a solid body. As a result, the stiffness of the housing 2 and, hence, the support element 1 are increased substantially, especially since the choke canal 9 prevents rapid equalization between the interior spaces 5 and 6.

Figure 2:
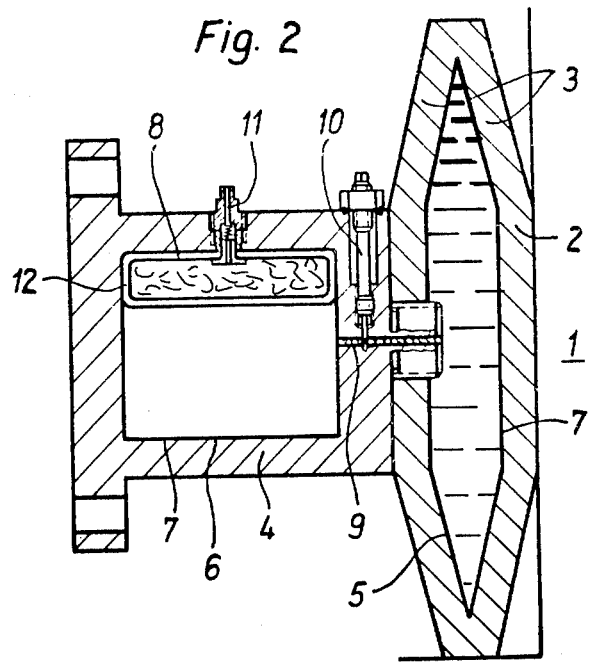

FIG. 2 shows a modification of the embodiment of the invention shown in FIG. 1 wherein an elastic container 12 formed, for example, of rubber, is employed in the housing 4 for receiving the compressible medium 8. The container 12 prevents reactions between the silicone rubber 7 and the compressible medium 8 which may occur through diffusion.

What is claimed is:

1. A support element for installation in the support assembly of a vertical electric machine comprising:

a resilient first housing means which exhibits elasticity in an action direction and volume stiffness otherwise with respect to an increase in internal pressure, said resilient housing means having its interior completely filled with a viscous medium comprised of silicone rubber;

a rigid second housing means which exhibits volume stiffness with respect to an increase in internal pressure, said second housing means having its interior filled partially with a viscous medium comprised of silicone rubber and partially with a compressible medium;

and means including choke means for connecting the interior of said first housing means to the interior of said second housing means.

2. A support element in accordance with claim 1 wherein:

said first housing means comprises a pair of cup springs.

3. A support element in accordance with claim 1 wherein said means for connecting includes a passage connecting the interiors of said first and second housing means;

and said choke means includes a throttle projecting into said passage.

* * * * *